United States Patent

Gondek

[11] Patent Number: 5,949,965
[45] Date of Patent: Sep. 7, 1999

[54] CORRELATING CYAN AND MAGENTA PLANES FOR ERROR DIFFUSION HALFTONING

[75] Inventor: Jay S. Gondek, Camas, Wash.

[73] Assignee: Hewlett-Packard Company, Palo Alto, Calif.

[21] Appl. No.: 08/880,475

[22] Filed: Jun. 23, 1997

[51] Int. Cl.⁶ .................................................... H04N 1/46
[52] U.S. Cl. ........................ 395/109; 358/534; 358/456; 382/252
[58] Field of Search ............................. 395/109; 358/534, 358/501, 455, 456, 465, 466; 382/162, 251, 252, 254, 270

[56] References Cited

U.S. PATENT DOCUMENTS

| | | | |
|---|---|---|---|
| 3,916,096 | 10/1975 | Everett et al. ........................ | 178/6.6 R |
| 4,339,774 | 7/1982 | Temple ..................................... | 358/283 |
| 5,313,287 | 5/1994 | Barton ..................................... | 358/458 |
| 5,739,917 | 4/1998 | Shu et al. ............................... | 358/534 |

OTHER PUBLICATIONS

Hewlett–Packard Patent Application 08/812,777 Mar. 6, 1997 Fast Error Diffusion Algorithm.

*Primary Examiner*—Thomas D. Lee

[57] ABSTRACT

The present invention performs error diffusion halftoning while taking into account multiple color planes, such as cyan and magenta, when determining the placement of a dot in any of the color planes. Using this technique, printed dots of two or more colors are dispersed so as to avoid noticeable clumping of dots of two or more colors. This technique can be used to augment any existing error diffusion method.

20 Claims, 6 Drawing Sheets

- ◨ Magenta
- ◪ Cyan
- ◩ C/M overlapping

| 33 | 33 | 33 |
|---|---|---|
| 33 | 33 | 33 |
| 33 | 33 | 33 | magenta

| 44 | 44 | 44 |
|---|---|---|
| 44 | 44 | 44 |
| 44 | 44 | 44 | cyan

| Light Blue (LB) | LB | LB |
|---|---|---|
| LB | LB | LB |
| LB | LB | LB |

☐ Magenta
☒ Cyan

CORRELATING CYAN AND MAGENTA PLANES FOR ERROR DIFFUSION HALFTONING

FIELD OF THE INVENTION

The present invention relates to a technique for color image processing and, more particularly, to an error diffusion technique which correlates dots printed from different color planes to create a more visually pleasing combination of different color dots.

BACKGROUND

Images, such as charts, drawings, and pictures, may be represented as a two-dimensional matrix of picture elements (pixels). The spatial resolution and intensity level for each pixel are chosen to correspond to the particular output device used. For example, typical computer monitors display images at 75 dots per inch (DPI) and have 256 levels of intensity for each color. Such monitors use the additive primary colors, red, green, and blue (RGB), which can be combined to produce millions of colors and also black.

Typical hardcopy output devices, such as inkjet printers, are binary devices, meaning that for each pixel or possible dot location on the printed medium they can only print at two levels: on or off. Therefore, some means must be provided to convert the monitor-based version of the image (256 intensity levels per color), or another version of the color image, to the binary version (2 levels per color). These conversion methods are commonly referred to as halftoning. Halftoning methods are described in the book Digital Halftoning, by Robert Ulichney, The MIT Press, 1987, incorporated herein by reference.

One major approach to halftoning is error diffusion. The decision about whether or not to print a dot is based not only on the "ideal" intensity (i.e., one of the 256 possible intensities) for that pixel, but on what has happened before for previously processed pixels. The present invention is directed to an error diffusion technique.

It is assumed in the following explanation that the pixel intensity may range between 0 and 255. In error diffusion, at each point where a dot may be printed, the original image pixel intensity between 0–255, plus accumulated error, is compared to a previously chosen threshold value. If the image pixel intensity is greater than the threshold value, a dot (255 intensity) is assigned to that pixel. If not, no dot (0 intensity) is assigned. In either case, the intensity difference between the actual dot value assigned (0 or 255) and the ideal image pixel intensity plus accumulated error for that point is derived, and this difference becomes an error term that is "diffused" to other subsequently processed pixels. In other words, the diffused error term is added to the image pixel intensity plus the accumulated error of the subsequently processed pixels, and this total resultant image pixel intensity is then compared against the error diffusion threshold to determine whether a dot should be printed. A typical threshold value is 50% of the maximum theoretical image pixel intensity. For example, if there are 256 intensity levels (0 to 255) per pixel, a level of 128 may be chosen as the threshold value. In other error diffusion techniques, the threshold varies to avoid noticeable dot patterns being printed.

A well known error diffusion technique is described by R. Floyd and L. Steinberg in the paper Adaptive Algorithm for Spatial Grey Scale, SID Int'l. Sym. Digest of Tech. Papers, pp. 36–37 (1975), incorporated herein by reference. The Floyd and Steinberg error diffusion technique diffuses the error into a set of four surrounding pixels. Error diffusion with higher than four terms can also be used. U.S. Pat. No. 5,313,287 to David Barton, assigned to the present assignee and incorporated herein by reference, discloses another error diffusion technique.

When printing a color image, dots for three primary colors, cyan, magenta, and yellow, must be printed in various combinations to achieve the desired color tones to reproduce the original color image. Many known error diffusion methods operate on one color plane (e.g., cyan, magenta, or yellow) at a time. These types of error diffusion methods strive to generate a visually pleasing pattern of dots (i.e., dispersed dots) for each separate color, independent of the pattern of dots for the remaining colors. Due to random chance, these overlapping color dot patterns inevitably result in two or more dots of different colors overlapping or being adjacent to one another, as shown in FIG. 1, which is perceived by the human eye as a clumping of dots.

FIG. 1 illustrates an example of a prior art multi-colored dot pattern using magenta dots 4 and cyan dots 6. The overall tone is light blue. When the cyan and magenta planes overlap, non-pleasing dot patterns due to adjacent cyan and magenta dots (such as at location 7) can be formed due to random chance.

SUMMARY

The present invention performs error diffusion halftoning while taking into account multiple color planes when determining the placement of a dot in any of the color planes. This technique can be used to augment most existing error diffusion methods. In the preferred method, only correlation between the magenta and cyan dots is performed, and no correlation with the yellow dots is performed. This is because the cyan and magenta dots are darker than the yellow dots, and adjacent cyan and magenta dots are much more noticeable than a cyan or magenta dot adjacent to a yellow dot. However, correlation with three or more color planes may be performed using the techniques described herein.

BRIEF DESCRIPTION OF THE DRAWINGS

FIG. 5 illustrates a 3×3 block of pixels and their tone values to be reproduced by halftoning.

FIG. 6 illustrates the 3×3 block of pixels in FIG. 5 but identifying the intensities of the cyan component of the tone values.

FIG. 7 illustrates the 3×3 block of pixels in FIG. 5 but identifying the intensities of the magenta component of the tone values.

DETAILED DESCRIPTION OF THE PREFERRED EMBODIMENTS

Figure 2:
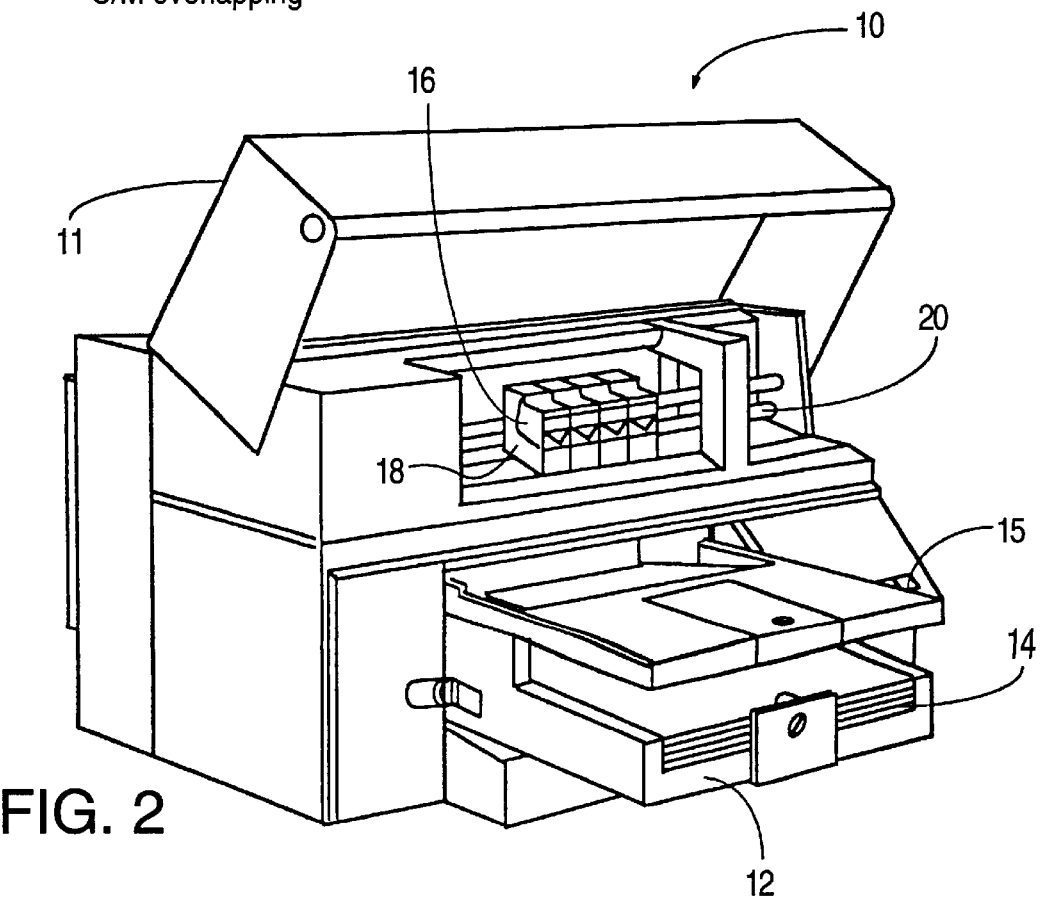
FIG. 2 illustrates a color inkjet printer which includes processing circuitry for performing all or part of the preferred error diffusion method.

FIG. 2 illustrates one type of color inkjet printer 10 which includes processing circuitry for performing all or part of the error diffusion method described herein. The color inkjet printer includes a cover 11, a paper tray 12 for holding virgin paper 14, an output tray 15 for receiving the printed pages, color print cartridges 16, and a scanning carriage 18 for sliding along a slide bar 20 while dots are being printed on the paper. The color print cartridges 16 may include cyan (C), magenta (M), yellow (Y), and black (K) ink print cartridges.

Figure 3:
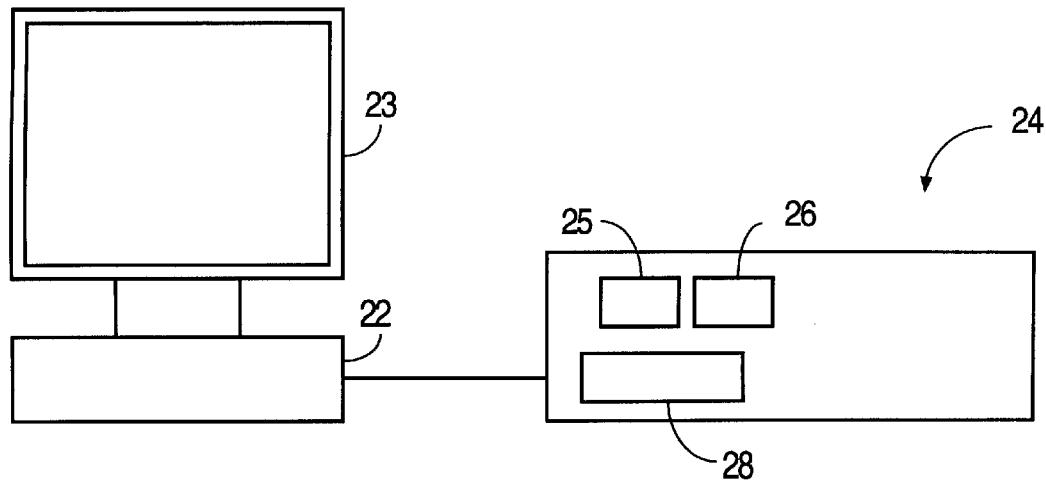
FIG. 3 illustrates a computer connected to an inkjet printer, where the computer or the printer or both carry out the inventive error diffusion method.

FIG. 3 is a schematic diagram of a printing system which includes a host computer 22, a monitor 23 (e.g., a CRT), and a printer 24. Printer 24 is a type of color inkjet printer which uses a tri-color (CMY) inkjet print cartridge 25 along with a black inkjet print cartridge 26 in a scanning carriage. Printer 10 in FIG. 2 may instead be connected to computer 22. Printer 24 includes a printer controller 28 for controlling the printing of dots by print cartridges 25 and 26. The print cartridges may print at 300 dots-per-inch (DPI), 600 DPI, or any other resolution.

Figure 4:
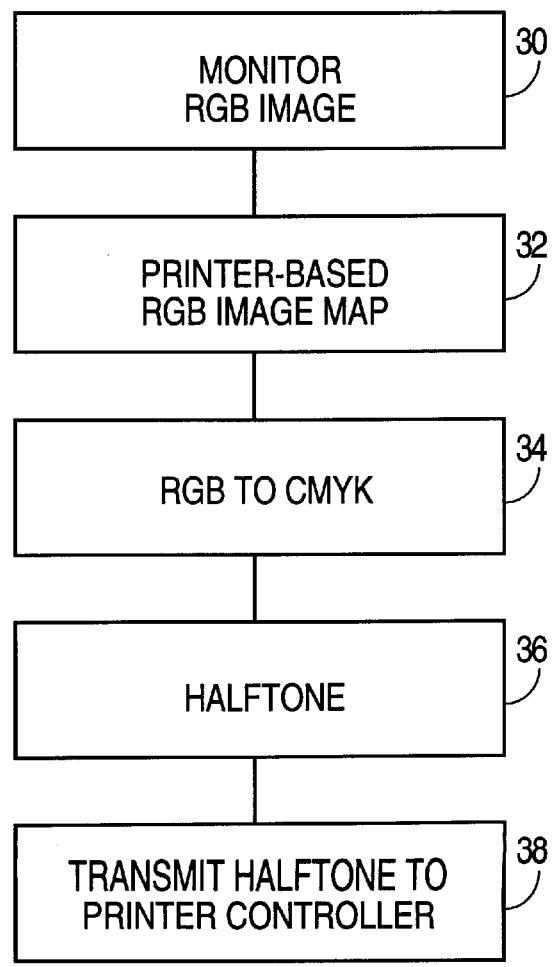
FIG. 4 illustrates the general method performed by the computer and printer of FIG. 3.

FIG. 4 illustrates the standard flow of image information from computer 22 to printer 24. An image is first created or introduced into the memory of computer 22. In order to be displayed on the computer monitor 23, this image is represented in additive RGB color space. Each pixel location on the screen can be illuminated in red, green, and blue at any one of 256 (0 to 255) levels of intensity. It takes 8 bits to represent 256 levels ($2^8$=256). Each of the three primary colors require 8 bits; therefore, RGB color monitors are commonly referred to as producing 24-bit color (3×8=24). This image is represented at the spatial resolution of the particular monitor. Typical monitors have 75 pixels per linear inch (75 DPI) in the vertical and horizontal directions.

At step 30, the 24-bit RGB color image is held in the memory of computer 22 so that it can be displayed on monitor 23.

At step 32, the image in memory is converted to a 24-bit RGB image at the resolution of the printer. Typical inkjet printers have a resolution of 300, 600 or 1200 dots per inch. Although the printer typically prints in CMY or CMYK subtractive colors, it is nevertheless convenient for image processing purposes at step 32 to consider the printer to be an RGB device. This is because later translating the color monitor RGB values directly to CMYK will usually produce a calorimetric match. However, not all of the matching values will produce the same image quality. Some choices will contain more visual noise than others, while other choices may lead to undesirable discontinuities in the halftone transitions of an image.

At step 34, the printer RGB color image is converted into CMYK color space using a lookup table or other conventional means of conversion.

In step 36, the CMYK image is halftoned to convert the image from 4-plane (CMYK), 8-bits per color to 4-plane binary color (on or off dots) at the DPI resolution of the printer. In other words, the color and intensity (0–255) at each pixel location is converted into a pattern of on or off C, M, Y, or K dots (0 or 255 intensity) to be printed. This halftoned image (which may be a portion of the total image) is stored in a memory. Step 36 is described in greater detail later.

At step 38, the halftone image is transmitted to the printer, typically using efficient communication techniques such as using escape sequences like those identified in Hewlett-Packard Company's Printer Control Language (PCL). The image produced at step 36 includes all of the information about how many dots of each color are to be printed at each pixel location on the page and the locations of the dots. The printer controller 28 (FIG. 3) decides when these dots should be printed (i.e., in a single pass or in multiple passes). Because of the nature of inkjet printing, it is often beneficial to lay down dots in more than a single pass and to print individual passes in some kind of checkerboard or other sparse pattern. It is also beneficial to overlap passes with these interstitial patterns to hide artifacts that may occur between swaths. These procedures for determining in what pass and in what pattern the dots will be laid down are referred to as "print modes."

The halftoning step 36 is now described in detail with reference to the remaining figures.

It will be understood that, depending on the printer, the functions discussed in relation to FIG. 4 can be performed by the host computer (programmed to carry out the processing functions) or by the printer. For example, in a "smart" printer, steps 32 through 38 could all be performed in the printer. On the other hand, to save memory costs in the printer, all or part of the functions 32 through 38 could be performed in the host computer.

Prior to the halftoning step, it is assumed that a separate image representation for the full color image is stored in a plane for each of the primary colors (C, M, Y, or K) to be printed. This is described with respect to FIGS. 5–7.

FIG. 5 illustrates a 3×3 block of pixels 40 in a full color image at the resolution of the computer monitor. Each of the pixels has a color intensity perceived as light blue (LB). The following assumes a range of intensities per pixel from 0–255 to convey the full range of color intensities. FIGS. 6 and 7 illustrate the same 3×3 pixel block in FIG. 5 but show the cyan intensity (FIG. 6) as 44 (out of 255) in each pixel region and the magenta intensity (FIG. 7) as 33 in each pixel region needed to create an overall light blue tone. The combination of the cyan and magenta intensities in the two planes will produce the final desired color tone. The cyan and magenta intensities are proportional to the number of dots in an area, where the intensity 255 is a complete fill of that area with cyan or magenta dots. The actual number of dots per original pixel location depends on the resolution (pixel density) of the original image and the resolution (dots per inch) of the printer.

Thus, it is assumed that step 34 of FIG. 4 has been completed, and the step of halftoning must now be performed.

Error diffusion attempts to recognize that for each point representing a potential dot position, there is usually a difference between what the hardcopy output device will print (e.g., a 0 or 255 intensity cyan dot) and the actual image pixel intensity (e.g., a 44 intensity cyan dot). The only time there is no such error is if the image pixel intensity is exactly 255 (a dot should be printed) or 0 (no dot should be printed). However, such circumstances are rare. Therefore, there is usually an error. If a dot is printed and the intensity level is less than 255, the error is positive (i.e., more tone level has been printed than was actually called for by the image pixel). If no dot is printed and the image pixel is greater than zero, the error is negative (i.e., less tone level has been printed than was called for by the image pixel). Error diffusion attempts to spread this error to neighboring pixels.

The below example assumes that the light blue tone of FIG. 5 to be reproduced requires a combination of cyan and magenta dots, with the cyan and magenta intensities shown in FIGS. 6 and 7. A different tone may also require the use of yellow dots or black dots in combination with the cyan and magenta dots. Instead of a standard error diffusion technique evaluating whether to print a cyan dot based upon the accumulated error from printing previous cyan dots, the preferred error diffusion technique selects whether a cyan or magenta dot should be printed based upon the combined error of the previous cyan and magenta dots.

Figure 8A:
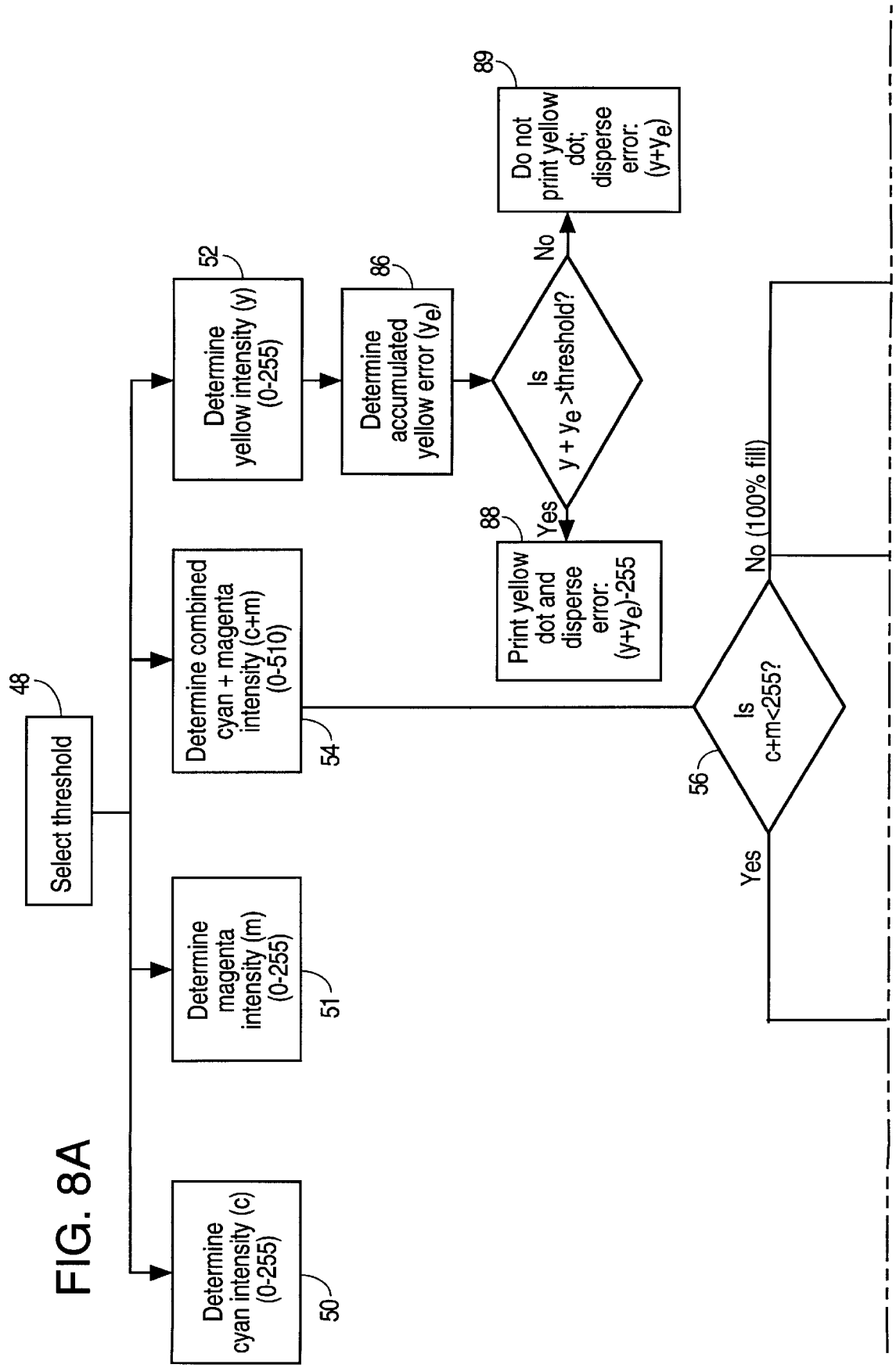
FIGS. 8A and 8B are flow charts which describes in more detail the halftoning method performed by the computer or the printer or a combination of both.
Figure 8B:
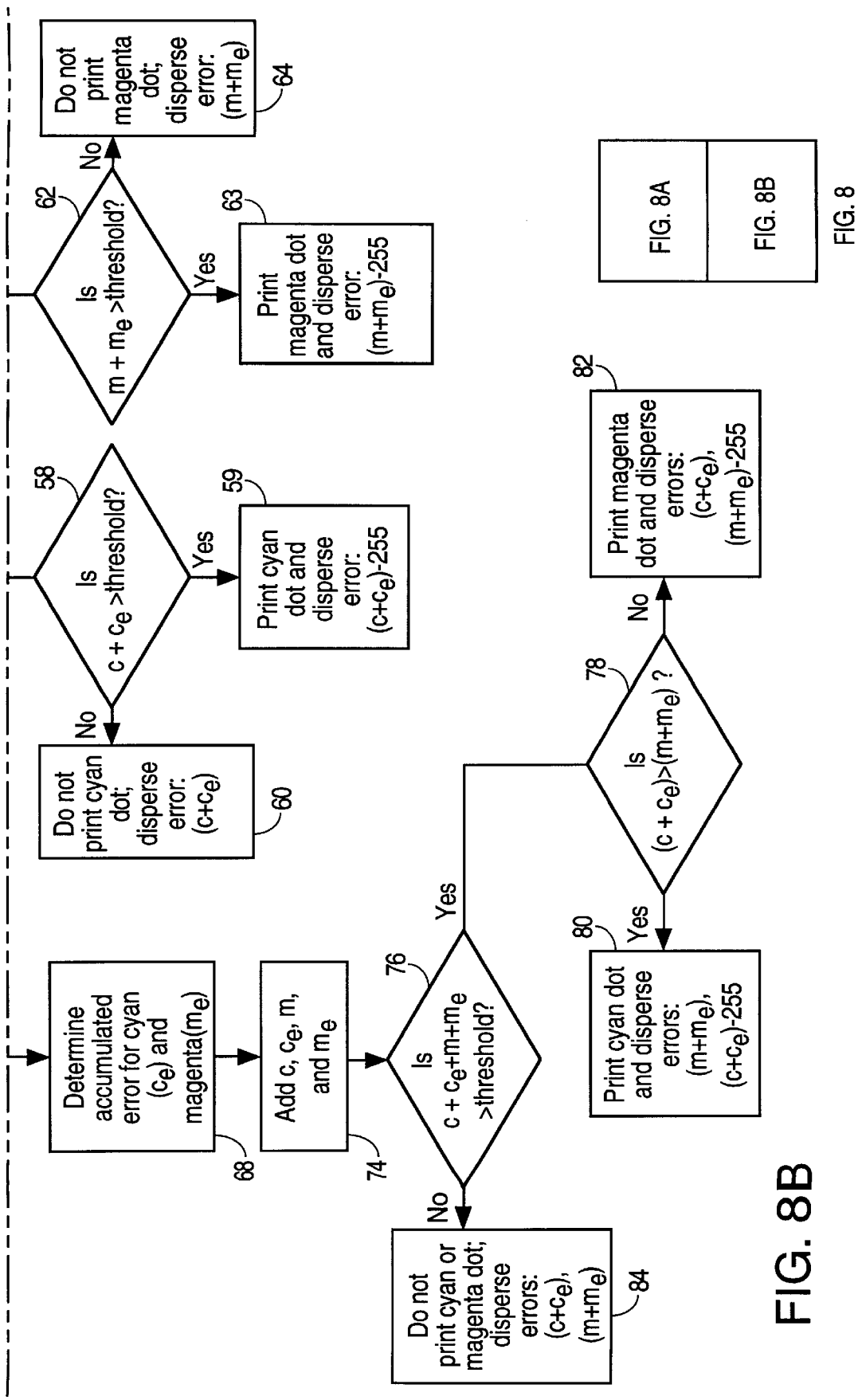

FIG. 8 is a flowchart illustrating the basic steps in the preferred error diffusion process for each dot position. In step 48, a threshold is selected. The threshold may be pseudo-randomly selected to avoid dot patterns being noticeable. The thresholds may be selected from a table or may be fixed throughout the halftoning process.

In steps 50, 51, and 52, the cyan intensity, magenta intensity, and yellow intensity for the particular pixel being processed are determined. Steps 50–52 may be performed in parallel using conventional techniques. For example, the 8-bit RGB intensities for that particular pixel may be cross-referenced to the 0–255 intensities for the CMY color planes using a lookup table or other conventional means. The steps for determining the CMY intensities may be performed as part of step 34 in FIG. 4.

In step 54, which may also be performed in parallel with steps 50–52, the combined cyan and magenta intensity is determined. This c+m intensity is obtained by adding the individual c and m intensities, so the range of c+m intensities is 0–510.

In step 56, it is determined whether the c+m intensity for a pixel position is less than a 100% fill (255 intensity) of the pixel area. If the c+m intensity is 255 or greater, then adjacent dots are required, and a conventional error diffusion technique (or the error diffusion technique described in the application by Y. Chen et al.) may be used to print the cyan and magenta dots. More particularly, if c+m is 255 or greater, then step 58 determines whether the cyan intensity plus the accumulated cyan error exceeds a threshold. If so, a cyan dot is printed (step 59); if not, no cyan dot is printed (step 60). Step 62 determines whether the magenta intensity plus the accumulated magenta error exceeds a threshold. If so, a magenta dot is printed (step 63); if not, no magenta dot is printed (step 64).

Figure 9:
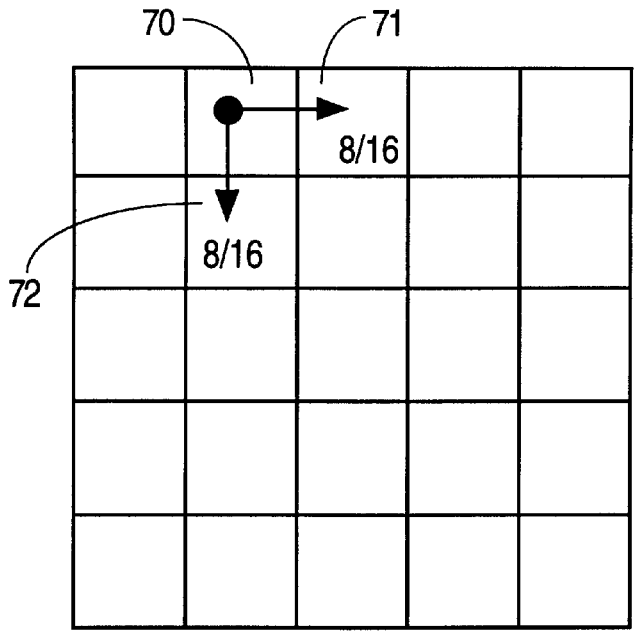
FIG. 9 illustrates dot positions and the portions of error diffused to two adjacent dot positions.

If c+m is less than 255, then the present invention is implemented. Step 68 determines the sum of the accumulated error for the cyan and magenta dots, where the error ($c_e$) for the cyan component is the diffused cyan error for the dot position, and the error ($m_e$) for the magenta component is the diffused magenta error for the dot position. In the preferred embodiment, the present invention modifies the error diffusion technique described in the application by Y. Chen et al., previously incorporated by reference. In this preferred error diffusion technique, illustrated in FIG. 9, a two-term error diffusion is used. Any error derived from the pixel (i.e., dot position) being processed (e.g., pixel 70) is diffused to the subsequent horizontal pixel 71 and to the adjacent vertical pixel 72. The proportion of the error diffused is ½ (50%) to each of these adjacent pixels. The determination whether or not to print a dot at that subsequent dot position 71 or 72 will then be based on whether the desired intensity plus the error exceeds a threshold.

Assuming the c+m intensity is less than 255 (i.e., less than a 100% fill of c+m), step 74 in FIG. 8 adds the cyan intensity (c), the cyan error ($c_e$), the magenta intensity (m), and the magenta error ($m_e$).

Step 76 determines if $c+c_e+m+m_e$ is greater than a threshold level. In the preferred method, the threshold levels are chosen to be relatively low, and the threshold levels are modulated with linear blue noise. The low-level thresholds reduce start-up delays, and the modulated thresholds additionally break up any worm-like patterns. The threshold modulation is a 256 element linear array or series of random threshold values ranging from 5 to 68. The average intensity level for these thresholds is 36.5, which is about 14of the maximum allowed level of 256.

If the outcome of step 76 is yes, step 78 determines whether the cyan intensity (c) plus the accumulated cyan error ($c_e$) for the dot position is greater than the magenta intensity (m) plus the accumulated magenta error ($m_e$) for the dot position. If so, a cyan dot is printed (step 80); otherwise, a magenta dot is printed (step 82).

If the outcome of step 76 is no, step 84 prints no cyan or magenta dot. For each of the printing or nonprinting actions, the resulting error is diffused to other dot positions.

In the preferred embodiment, after each row of the image is processed, the direction of processing is reversed such that the error diffusion technique uses a serpentine processing system. A non-serpentine path may also be used.

If the tone to be created only uses either cyan or magenta, then the cyan or magenta intensity, as appropriate, would be zero, and the cyan or magenta error, as appropriate, would be zero. In either case, the preferred process described above still accurately prints the desired density of cyan dots and magenta dots, since either $c+c_e$ will be greater than $m+m_e$, causing a cyan dot to be printed, or $m+m_e$ will be greater than $c+c_e$, causing a magenta dot to be printed. Alternatively, if either cyan or magenta is not needed to reproduce a color, a conventional error technique may be used.

The determination for printing a yellow dot may be performed in parallel with the steps for printing the cyan and magenta dots. The determination for printing a yellow dot, in the preferred embodiment, uses the error diffusion technique described with respect to FIG. 9 and includes the steps shown in FIG. 8 as steps 86, 87, 88, and 89.

By using the above process to determines whether to print a cyan or magenta dot based upon the combination of the cyan and magenta intensities and their combined errors, the dispersion of cyan and magenta dots within the dot pattern is well formed. In pseudo-code, the algorithm is as follows:

```
If((c+m) <255 {
    If((cm+m) >threshold) {
        If(c>m)
            fire cyan dot
        Else
            fire magenta dot
    }
}
else{
    if(c>threshold)
        fire cyan dot
    if(m>threshold0
        fire magenta dot
}
if(y>threshold)
    fire yellow dot
distribute the errors
```

In an alternate embodiment, even the yellow plane can be correlated with the cyan and magenta planes in a manner similar to that described above in which a color dot (C, M, or Y) having the highest priority based upon the tone value and the accumulated error gets printed. This would disperse the C, M, and Y dots.

Further, the tone to be reproduced may be created by a combination of additional planes such as light cyan, light magenta, dark cyan, and dark magenta, in addition to medium cyan and medium magenta. Black may be included as an additional plane. Some printers use the color planes cyan, magenta, yellow, orange, green, and black. The invention may be applied to a combination of all of these planes to reduce the likelihood that adjacent dots within a group of colors are printed.

Also there can be a prioritization of inks to be printed when correlating multiple planes. One example of such a prioritization method for cyan, magenta, and black inks is shown below in pseudo-code (yellow is not addressed for simplicity).

```
If (c+m+k)< 255
    fire one of c,m,k
else {
    if (c+k) < 255
        fire (c or k) and error diffuse m
else {
    if (m+k) < 255
        fire (m or k) and error diffuse c
else {
    if (c+m) < 255
        fire (c or m) and error diffuse k
```

Figure 1:
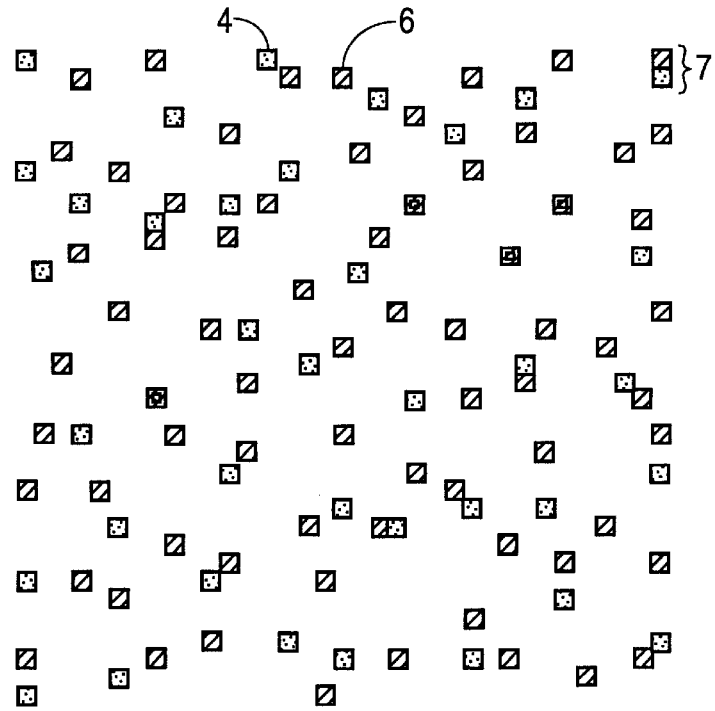
FIG. 1 illustrates a prior art dot pattern representing an arrangement of cyan and magenta dots.
Figure 10:
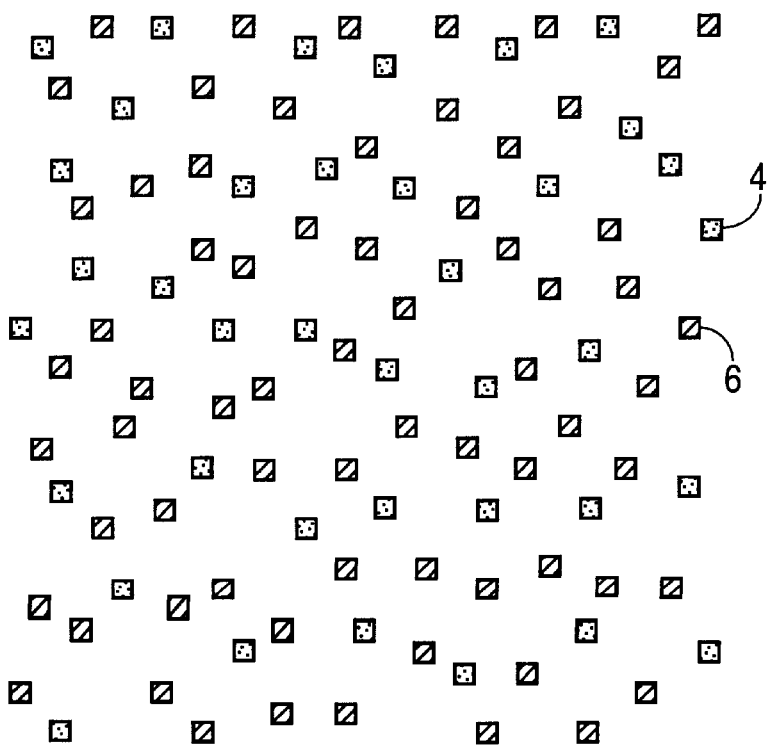
FIG. 10 is an example of a dot pattern of cyan and magenta dots printed using the error diffusion method of the present invention to be contrasted with the dot pattern in FIG. 1 for generating the same light blue tone value.

FIG. 10 is an example of a light blue tone printed using a combination of cyan dots 6 and magenta dots 4 having the intensities shown in FIGS. 6 and 7. As seen, there are no adjacent or overlapping cyan and magenta dots, creating a dot pattern which is more visually pleasing than the prior art dot pattern shown in FIG. 1.

This proven method is as fast as other error diffusion techniques for halftoning.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A halftoning technique comprising:
    performing error diffusion to determine whether a dot of a first color ink or a dot of a second color ink is to be printed in a pixel position; and
    correlating printing of dots of said first color with dots of said second color to reduce a likelihood that printed dots of said first color will be directly adjacent printed dots of said second color, said correlating comprising:
        generating an error value for said first color from said step of performing error diffusion;
        generating a color value for said first color for said pixel position;
        generating a first sum of said error value for said first color and said color value for said first color;
        generating an error value for said second color during said step of performing error diffusion;
        generating a color value for said second color for said pixel position;
        generating a second sum of said error value for said second color and said color value for said second color; and
        comparing said first sum to said second sum, and if said first sum is greater than said second sum, printing a dot of said first color in said pixel position, and if said second sum is greater than said first sum, printing a dot of said second color in said pixel position.

2. The method of claim 1, wherein said steps of performing error diffusion and correlating printing of dots are also performed for at least a third color ink, said method further comprising the step of:
    prioritizing said first color ink, said second color ink, and said third color ink when determining a color ink dot to print.

3. The method of claim 2 further comprising the step of printing a dot of said first color ink, said second color ink, or said third color ink based on said steps of performing error diffusion, correlating printing of dots, and prioritizing.

4. The method of claim 1 wherein said steps of performing error diffusion and correlating printing comprise:
    (a) determining a tone to be reproduced using at least two colors, including said first color and said second color;
    (b) setting a threshold value;
    (c) identifying an intensity of said first color component in said tone to be reproduced;
    (d) identifying an intensity of said second color in said tone to be reproduced;
    (e) accumulating a first error value signifying an error in intensity between printed dots of said first color and a desired intensity of said first color;
    (f) accumulating a second error value signifying an error in intensity between printed dots of said second color and a desired intensity of said second color;
    (g) summing said desired intensity of said first color, said first error value, said desired intensity of said second color, and said second error value to generate a sum value;
    (h) determining whether said sum value is greater than said threshold value and, if so, determining that either a dot of said first color or a dot of said second color should be printed; and
    (i) determining whether said desired intensity of said first color plus said first error value is greater than said desired intensity of said second color plus said second error value and, if so, printing said dot of said first color or, if not, printing said dot of said second color.

5. The method of claim 4 wherein said first color is cyan and said second color is magenta.

6. The method of claim 4 wherein said colors include two or more colors selected from the group consisting of light cyan, light magenta, medium cyan, medium magenta, dark cyan, and dark magenta.

7. The method of claim 4 wherein said colors include two or more colors selected from the group consisting of cyan, magenta, and black.

8. The method of claim 4 wherein said colors include two or more colors selected from the group consisting of cyan, magenta, yellow, orange, green, and black.

9. The method of claim 4 wherein steps h and i are only conducted if it is determined that said sum value in step g equates to less than a solid fill of dots of said first color and/or said second color.

10. The method of claim 9 wherein, if it is determined in step g that said sum value is equal to or greater than said solid fill of dots of said first color and/or said second color, then using an error diffusion process to print said dots of said first color or said dots of said second color which does not combine intensities and error values of said first color and said second color.

11. The method of claim 9 wherein said intensity of said first color and said intensity of said second color each has 256 levels ranging between 0–255, and wherein said sum value equating to said solid fill of dots is at least 255.

12. The method of claim 4 further comprising the step of printing dots of said first color and said second color between steps d and e.

13. The method of claim 12 wherein said method forces said dots of said first color and said dots of said second color to be separated from one another so as not to be adjacent.

14. The method of claim 1 wherein said method is performed by a printing system comprising an inkjet printer and a computer.

15. A printing system including a printer and a computer, said printing system performing a halftone method which correlates printing of dots from multiple color planes to reduce a likelihood that printed dots of any color will be directly adjacent one another, said method performed by said system comprising:

(a) determining a tone to be reproduced using at least two colors, including said first color and said second color;

(b) setting a threshold value;

(c) identifying an intensity of said first color component in said tone to be reproduced;

(d) identifying an intensity of said second color in said tone to be reproduced;

(e) accumulating a first error value signifying an error in intensity between printed dots of said first color and a desired intensity of said first color;

(f) accumulating a second error value signifying an error in intensity between printed dots of said second color and a desired intensity of said second color;

(g) summing said desired intensity of said first color, said first error value, said desired intensity of said second color, and said second error value to generate a sum value;

(h) determining whether said sum value is greater than said threshold value and, if so, determining that either a dot of said first color or a dot of said second color should be printed; and (i) determining whether said desired intensity of said first color plus said first error value is greater than said desired intensity of said second color plus said second error value and, if so, printing said dot of said first color or, if not, printing said dot of said second color.

16. The system of claim 15 wherein said colors include two or more colors selected from the group consisting of cyan, magenta, yellow, orange, green, and black.

17. The system of claim 15 wherein said printer is an inkjet printer.

18. The system of claim 17 further comprising a separate print cartridge for each color ink to be printed.

19. The system of claim 17 further comprising a print cartridge which prints black ink and a print cartridge which prints multiple colors of ink.

20. The system of claim 15 wherein said steps of a through i are also performed for at least a third color ink, said method further comprising the steps of:

prioritizing said first color ink, said second color ink, and said third color ink when determining a color ink dot to print.

* * * * *

UNITED STATES PATENT AND TRADEMARK OFFICE
CERTIFICATE OF CORRECTION

PATENT NO : 5,949,965
DATED : September 7, 1999
INVENTOR(S) : Gondek

It is certified that error appears in the above-identified patent and that said Letters Patent is hereby corrected as shown below:

Column 3, (line 51), delete "calorimetric" and insert therefor --colorimetric--.
    Column 6, (line 9), delete "14of" and insert therefor --14% of--.
    Column 6, (line 47), delete "If((cm+m)>threshold) {" and insert therefor --If((c+m)>threshold) {--.
    Column 6, (line 56), delete "if(m>threshold0" and insert therefor --if(m>threshold)--.

Signed and Sealed this

Eleventh Day of April, 2000

Q. TODD DICKINSON

Attest:

Attesting Officer

Director of Patents and Trademarks